March 11, 1952     A. Y. DODGE     2,588,495
FAN DRIVE CLUTCH

Filed Jan. 25, 1950     2 SHEETS—SHEET 1

INVENTOR:
Adiel Y. Dodge,
BY Dawson, Ooms, Booth and Spangenberg,
ATTORNEYS.

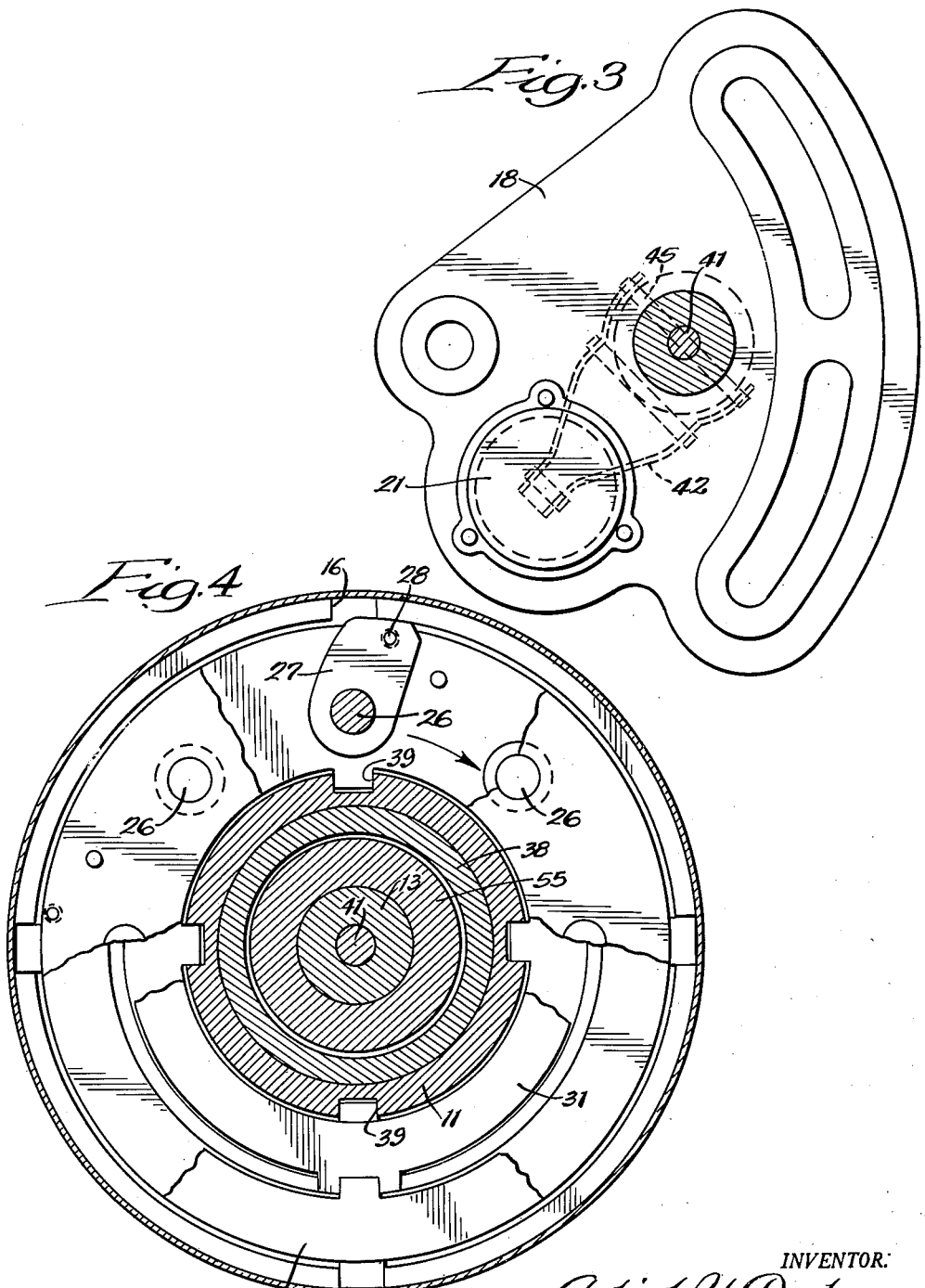

Patented Mar. 11, 1952

2,588,495

UNITED STATES PATENT OFFICE 2,588,495

FAN DRIVE CLUTCH

Adiel Y. Dodge, Rockford, Ill.

Application January 25, 1950, Serial No. 140,500

10 Claims. (Cl. 192—12)

1

This invention relates to fan drive clutches and more particularly to a clutch to control driving of the cooling fan in an automotive vehicle.

In automotive vehicles with water cooled engines, it is necessary under certain driving conditions to provide a fan to increase the flow of air through the cooling radiator while under other conditions it is desirable to eliminate the fan thereby to eliminate the unnecessary dissipation of heat and the power required to drive the fan. For example, when the engine is cold or within the normal operating range or when the vehicle is operating at high speeds, the fan is unnecessary and consumes a substantial amount of horsepower. On the other hand under high temperature conditions and particularly when the vehicle is reduced to relatively low speed a fan is essential to prevent excessive overheating.

Fan drives have heretofore been proposed to disconnect the fan from the vehicle engine under conditions when use of the fan is undesirable. Such mechanisms have generally included a clutch controlled by a thermostat responsive to engine temperature. Since a relatively large clutch must be employed for this purpose, such devices have required a large, expensive thermostat to provide the necessary force for clutch operation. Furthermore, such devices have been relatively unreliable in operation and have been short lived.

It is one of the objects of the present invention to provide a fan drive clutch in which the control element such as the thermostat controls only a relatively small secondary clutch which controls the main drive clutch through a cam mechanism. With this construction a small inexpensive thermostat can be employed while obtaining a sufficiently powerful main driving clutch to drive the fan properly.

Another object is to provide a fan drive clutch in which the thermostat operates through a snap action mechanism to produce a decisive engagement or disengagement without unnecessary slipping.

Still another object is to provide a fan drive clutch in which overrunning of the fan during engine deceleration is prevented, thereby to reduce the number of clutch engagements.

Another object is to provide a thermostatic control mechanism which when it fails will fail on the safe side with the fan clutch engaged.

Still another object is to provide a fan drive clutch in which the main clutch is operated through a cam mechanism and in which means are provided to move the cam mechanism quickly

2 to clutch disengaging position. In one desirable structure a torsion spring may be provided to urge the cam mechanism to its clutch disengaging position, and according to another feature this spring may be replaced by or augmented by a friction clutch or brake mechanism functioning momentarily to urge the cam mechanism to its clutch releasing position.

The above and other objects and advantages of the invention will be more readily apparent when read in connection with the accompanying drawings, in which—

Figure 3 is a section on the line 3—3 of Figure 1; and

Figure 1:
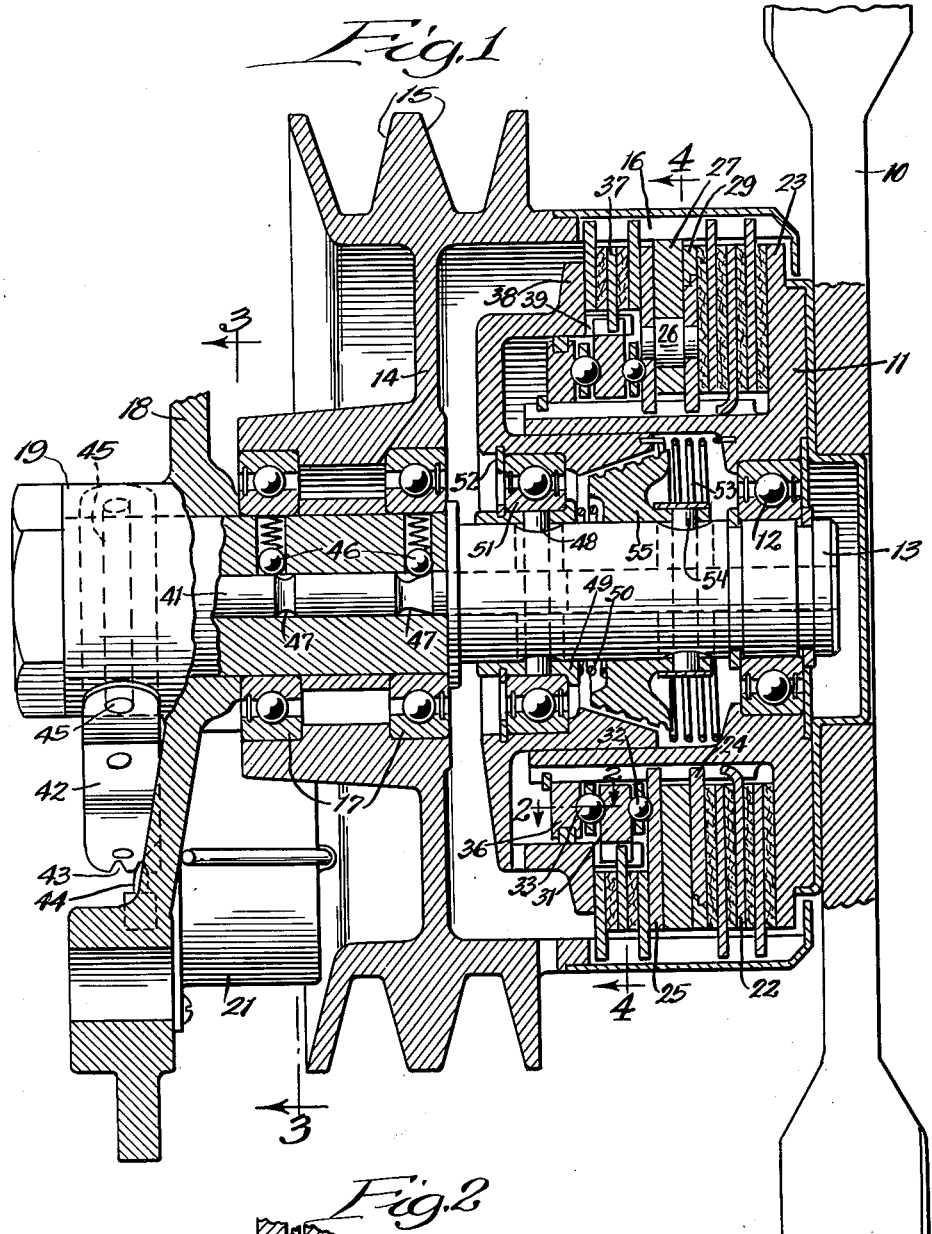
Figure 1 is an axial section of a fan drive clutch embodying the invention.

Fgure 4 is a section on the line 4—4 of Figure 1 with parts broken away.

The fan drive of the present invention is adapted to drive a cooling fan 10 which may be mounted in the usual manner behind the radiator of an automotive vehicle to draw air therethrough. The fan is supported on a tubular driven member 11 which is rotatably mounted on bearings 12 on a stationary shaft 13. The stationary shaft may be secured to the engine or to any other desired supporting structure.

The fan is adapted to be driven by a tubular hollow driving member 14 formed with pulley receiving grooves 15 at its periphery and having a splined cylindrical sleeve portion 16 overlying and coaxial with the driven hub 11. The driving member may be mounted on the shaft 13 on bearings 17 and may be driven through one or more belts in the usual manner.

At its rear end the shaft 13 is supported in a supporting casting 18 which may be a part of or may be secured to the engine. The supporting member 18 includes a hub portion 19 surrounding the shaft and carries a thermostatic bellows 21 which is in communication with the coolant space in the engine, preferably through a bulb and capillary tube containing a substance having a vapor pressure close to atmospheric pressure at 190° F. The bellows 21 will, therefore, expand and contract in response to the engine coolant temperature to control the fan drive.

The driving and driven members are adapted to be connected through a friction clutch 22 having a plurality of clutch discs alternately splined to the driven hub 11 and the driving sleeve 16. The usual springs, not shown, may be included in the clutch to separate the discs so that when the pressure on the clutch plates is released the clutch will disengage. The clutch plates are compressed between an integral flange 23 on the hub 11 and a pressure plate 24 which is slidably splined on the hub 11.

According to the present invention the pressure plate is a composite structure carrying a one-way drive mechanism to prevent overrunning of the fan. As shown, the pressure plate includes the plate 24 and a plate 25 spaced therefrom and also splined to the hub 11. The plates 24 and 25 are connected by pivot pins 26 on which pawls 27 are pivoted, as best seen in Figure 4. The pawls lie at an angle to radii through them so that they tend to move out in response to centrifugal force into engagement with the inner surface of the sleeve portion 16. The driving member 16 can turn forward or clockwise as seen in Figure 4 relative to the driven member 11 due to the angle of the pawls. However, if the driven member tends to overrun the driving member forwardly, the pawls will wedge against the sleeve portion 16 to prevent this action. To insure that all of the pawls will move simultaneously they may be connected through pins 28 at their outer ends to a friction ring 29 which is movable relative to the pressure plate 24 but which frictionally engages the pressure plate to tend to turn with it. This construction not only insures uniform engagement and disengagement of the pawls but holds the pawls away from the outer driving sleeve when the clutch is disconnected and the driving member is turning clockwise relative to the driven member.

Figure 2:
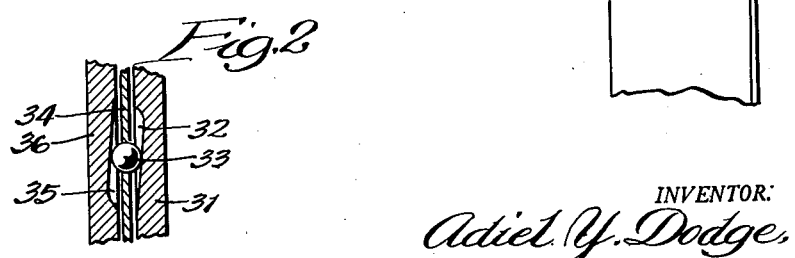
Figure 2 is a partial detailed section on the line 2—2 of Figure 1 showing the cam construction.

The main clutch, as described, is adapted to be engaged by a cam mechanism including a rotatable cam ring 31 connected through a thrust bearing 32 to the pressure plate 25. At its opposite side the cam ring 31 is formed with a series of tapered grooves 32, as best seen in Figure 2, which receive cam balls 33 held spaced by an annular cage 34. The balls also engage similar cam grooves 35 formed in a ring 36 secured to the inner end of the driven sleeve 11. When the cam ring 31 and the ring 36 are turned relative to each other, the balls will ride into or out of the cam notches 32 and 35 either to shift the pressure plate toward its clutch engaging position or to release the pressure plate for disengagement of the clutch.

Engagement of the clutch is preferably controlled by a spring located inside of the bellows 21 or by the spring effect of the bellows housing. The sub-atmospheric pressure at low temperatures causes the bellows to compress the springs and disengage the clutch.

The cam ring is turned from the driving member through a second friction clutch 37 which may be a relatively small clutch and which is controlled by the springs and the thermostat 21. As shown, the clutch 37 includes a plurality of frictionally engageable discs alternately splined to the driving sleeve 16 and to the cam ring 31. The clutch 37 is adapted to be engaged by a pressure plate 38 shiftable axially of the fan drive clutch and slidably connected through spline extensions or fingers 39 to the cam ring 31.

To shift the pressure plate a control rod 41 is provided which is shiftable axially in the stationary shaft 13. The control rod is connected to the thermostat 21 through a lever 42 pivoted on the support 18 intermediate its ends and connected at its outer end to the thermostat. Preferably the outer end of the control yoke 42 is formed with notches 43 to be engaged by a spring detent 44 to provide a snap action movement for the yoke lever 42. At its inner end the lever carries a pin 45 extending through elongated slots in the hub 19 and engaging the rod 41 to shift it axially when the thermostat expands or contracts. Additional snap action movement may be provided by spring detents 46 engageable with annular notches 47 in the rod 41 so that the rod will move decisively to either of its extreme positions and will be resiliently held in such positions until the thermostat develops sufficient force to shift it.

The rod carries a transverse pin 48 extending through slots in the shaft 13 and connected to a collar 49 carrying a bearing 51 whose outer race supports the pressure plate 38. Preferably, a lost motion connection is provided between the control rod 41 and the pressure plate 38 either by having the pin 48 work in a slightly elongated slot in the control rod 41 or by providing a sliding connection between the bearing outer race and the pressure plate. As shown, the pin 48 works in a slot in the control rod 41 and the bearing outer race is rigidly held between an integral shoulder on the pressure plate and a stop ring 52 spaced from the shoulder.

To insure return of the cam ring to a clutch disengaging position, when the clutch 37 is disengaged a torsion spring 53 connects the driven member 11 to the pressure plate, as shown. The spring is biased in a direction to turn the pressure plate and through it to turn the cam ring 31 to a position in which the cam balls 33 lie in the deep ends of the notches 32 and 35. In this position the cam mechanism exerts no pressure on the main clutch so that it disengages to disconnect the fan drive.

In addition to or in place of the spring 53 a brake mechanism may be provided to turn the cam ring to its clutch releasing position when the second clutch 37 is disengaged. As shown, this mechanism comprises a second pin 54 rigidly carried by the control rod 41 and extending through slots in the shaft 13. The pin 54 is connected to a conical brake member 55 which is slidable on the shaft 13 and which frictionally engages an internal conical surface on the pressure plate 38. A spring 50 engages the brake member 55 and the bearing 51 to urge them apart. In operation of the device when the thermostat 21 is cool the control rod 41 will be shifted to the left and will be held in this position by the spring detent mechanisms. At this time the pressure plate 38 is forced to the left by the brake 55 thus to turn the cam ring 31 to the disengaged position. The spring 53 also tends to turn the cam ring to a position in which the main clutch 22 is disengaged as explained above so that there is no driving connection between the driving and driven members.

As the temperature rises, the thermostat will expand and upon reaching the predetermined control temperature set by adjustment of the thermostat, the thermostatic springs will shift the control rod 41 to the right to the position shown. It will be noted that the right hand notch 47 has a relatively elongated tapering surface so that the spring detent 46 cooperating with this notch will exert a constant pressure to the right on the control rod. When the control rod shifts it shifts the pressure plate 38 to the right to engage the clutch 37. This clutch drives the cam ring 31 in a direction to move the cam balls 33 toward the shallow ends of the notches 32 and 35, thereby shifting the pressure plates 24 and 25 to the right to engage the main clutch 22. With this clutch engaged, the driving member will drive the driven member and the fan through both clutch 37 and the main clutch 22.

Upon deceleration, the fan will tend to overrun the driving member, and this operation will be prevented by the pawls 27. With the driven member turning, the pawls will be thrown outward by centrifugal force into engagement with the outer driving sleeve 16 so that if the fan tends to turn faster than the driving member in the direction of the arrow in Figure 4, the pawls will prevent this action, thus to reduce the number of unnecessary disengagements and engagements to a minimum.

When the engine again cools to the point at which the fan is not desired, the thermostat will contract and will shift the springs and the control rod 41 to the left. During the initial part of this movement the brake member 55 will engage the cam ring 38 and through it will turn the cam ring rapidly to its clutch releasing position. As this occurs, the pressure plate 38 will move away from the brake member to disengage the brake and at the same time the main clutch 22 will be released to disconnect the fan from the driving member.

Engagement is caused by a spring which may be the bellows casing only or a helical spring, not shown, inside of the bellows 21. Disengagement is caused by the bellows contracting due to low temperatures. Thus, any failure of the bellows will allow engagement to take place.

While one embodiment of the invention has been shown and described in detail herein, it will be understood that this is illustrative only and is not to be taken as a definition of the scope of the invention, reference being had for this purpose to the appended claims.

What is claimed is:

1. A fan drive clutch comprising a driving member, a driven member, a main friction clutch including frictionally engageable elements connected to said members respectively, a loading cam device to move the main clutch elements into engagement and including relatively rotatable cam parts, a second clutch to connect one of said cam parts to the driving member, means to control the second clutch, and one-way acting means to connect the driving and driven members to prevent relative rotation thereof in one direction.

2. A fan drive clutch comprising a driving member, a driven member, a main friction clutch including frictionally engageable elements connected to said members respectively, a loading cam device to move the main clutch elements into engagement and including relatively rotatable cam parts, a second clutch to connect one of said cam parts to the driving member, means to control the second clutch, and speed responsive clutch means engageable in response to the speed of the driven member to connect the driving and driven members.

3. A fan drive clutch comprising a driving member, a driven member, a main friction clutch including frictionally engageable elements connected to said members respectively, a loading cam device to move the main clutch elements into engagement and including relatively rotatable cam parts, a second clutch to connect one of said cam parts to the driving member, control means movable in one direction to engage the second clutch and in the other direction to cause disengagement thereof, and means including a brake engaged by movement of the control means in said other direction to turn said one of the cam parts relative to the driving member in a direction to release the main clutch.

4. A fan drive clutch comprising a driving member, a driven member, a main friction clutch including frictionally engageable elements connected to said members respectively, a loading cam device to move the main clutch elements into engagement and including relatively rotatable cam parts, a second clutch to connect one of said cam parts to the driving member, means to connect the other of the cam parts to the driven member, control means movable in one direction to engage the second clutch and in the other direction to cause disengagement thereof, and a brake temporarily engaged by movement of the control means in said other direction to hold said one of the cam parts stationary.

5. A fan drive clutch comprising a rotatable tubular driving member, a rotatable circular driven member coaxial with and lying within the driving member, a friction clutch having frictionally engageable elements one of which is connected to the driving member and another of which is connected to the driven member, cam mechanism including an annular cam ring rotatable on the driven member to press said elements into engagement, a second friction clutch to connect the cam ring to the driving member, control means responsive to a condition affected by the fan drive to control the second clutch, and one-way acting means connecting the driving and driven members to prevent relative rotation thereof in one direction.

6. A fan drive clutch comprising a rotatable tubular driving member, a rotatable circular driven member coaxial with and lying within the driving member, a friction clutch having frictionally engageable elements one of which is connected to the driving member and another of which is connected to the driven member, cam mechanism including an annular cam ring rotatable on the driven member to press said elements into engagement, a second friction clutch to connect the cam ring to the driving member, and speed responsive pawls pivoted on the driven member and engageable with the driving member to prevent relative rotation of the driving and driven members in one direction.

7. A fan drive clutch comprising a rotatable tubular driving member, a rotatable circular driven member coaxial with and lying within the driving member, a friction clutch having frictionally engageable elements one of which is connected to the driving member and another of which is connected to the driven member, cam mechanism including an annular cam ring rotatable on the driven member to press said elements into engagement, a second friction clutch to connect the cam ring to the driving member, control means to control the second clutch, and a brake engaged temporarily by operation of the control means to disengage the second clutch to turn the cam ring in a direction relative to the driving member to release the first named clutch.

8. A fan drive clutch comprising a rotatable tubular driving member, a rotatable circular driven member coaxial with and lying within the driving member, a friction clutch having frictionally engageable elements one of which is connected to the driving member and another of which is connected to the driven member, cam mechanism including an annular cam ring rotatable on the driven member to press said elements into engagement, a second friction clutch to connect the cam ring to the driving member, control means to control the second clutch, and a brake engaged temporarily by operation of the control means to release the second clutch to hold the cam ring stationary.

9. A fan drive clutch comprising a rotatable tubular driving member, a rotatable circular driven member coaxial with and lying within the driving member, a friction clutch having frictionally engageable elements one of which is connected to the driving member and another of which is connected to the driven member, cam mechanism including an annular cam ring rotatable on the driven member to press said elements into engagement, a second friction clutch to connect the cam ring to the driving member, a pressure plate shiftable axially of the members to engage the second clutch, an axially shiftable control rod, a lost motion connection between the control rod and the pressure plate, a brake connected to the cam ring, and a connection between the control rod and the brake to engage the brake when the control rod is shifted in a direction to release the second clutch.

10. A fan drive clutch comprising a rotatable tubular driving member, a rotatable circular driven member coaxial with and lying within the driving member, a friction clutch having frictionally engageable elements one of which is connected to the driving member and another of which is connected to the driven member, cam mechanism including an annular cam ring rotatable on the driven member to press said elements into engagement, a second friction clutch to connect the cam ring to the driving member, a pressure plate shiftable axially of the members to engage the second clutch, an axially shiftable control rod, a lost motion connection between the control rod and the pressure plate, a connection between the pressure plate and cam ring to hold them against relative rotation, a brake to hold the pressure plate against rotation, and a connection between the control rod and the brake to engage the brake when the control is shifted to release the second clutch, and a one-way clutch connecting the driving and driven members to prevent the driven member from overrunning the driving member.

ADIEL Y. DODGE.

REFERENCES CITED

The following references are of record in the file of this patent:

UNITED STATES PATENTS

| Number | Name | Date |
|---|---|---|
| 1,159,663 | Guillery | Nov. 9, 1915 |
| 1,974,390 | Eason | Sept. 18, 1934 |
| 2,214,391 | Weydell | Sept. 10, 1940 |
| 2,516,269 | Starkey | July 25, 1950 |